2 Sheets—Sheet 1.

F. B. HUNT.

Straw Cutter.

No. 2,368.

Reissued Oct. 2, 1866.

Witnesses:
Geo. Dwinker
Chas. H. Smith

Inventor:
F. B. Hunt
per L. W. Serrell
Atty.

N. PETERS, Photo-Lithographer, Washington, D. C.

F. B. HUNT.
Straw Cutter.
No. 2,368. Reissued Oct. 2, 1866.
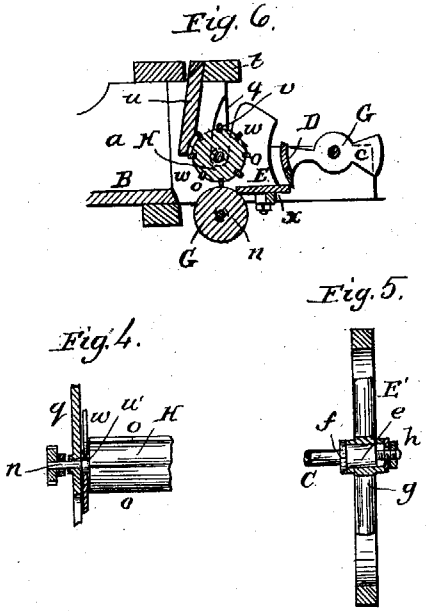
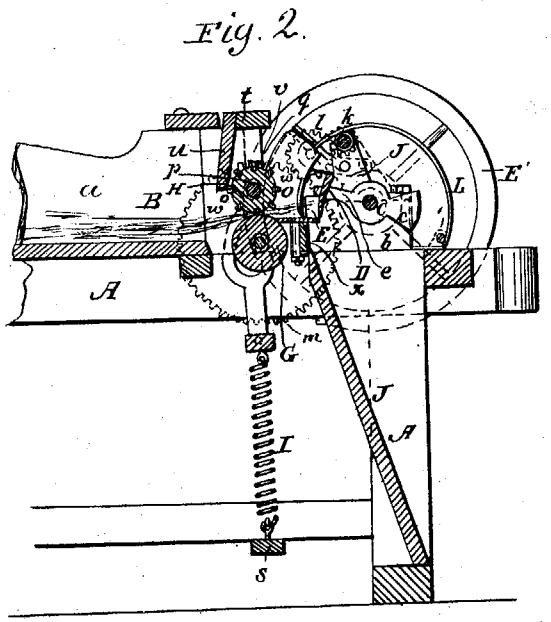
Witnesses:
Chas. H. Smith
Geo. D. Walker
Inventor:
Franklin Benjamin Hunt
N. PETERS. Photo-Lithographer, Washington, D. C.

UNITED STATES PATENT OFFICE.

FRANKLIN BENJAMIN HUNT, OF RICHMOND, INDIANA.

IMPROVEMENT IN STRAW-CUTTERS.

Specification forming part of Letters Patent No. 41,070, dated January 5, 1864; Reissue No. 2,368, dated October 2, 1866.

*To all whom it may concern:*

Be it known that I, FRANKLIN BENJAMIN HUNT, of Richmond, in the county of Wayne and State of Indiana, have invented certain new and useful Improvements in Machines for Cutting Straw, &c.; and I do hereby declare that the following is a full, clear, and exact description of the same, reference being had to the accompanying drawings, making a part of this specification, in which—

Figure 1:
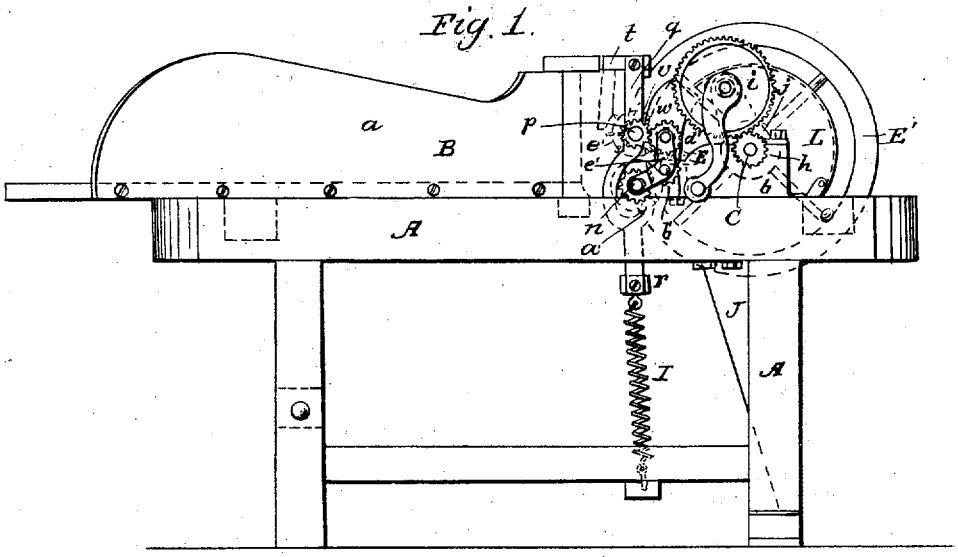
Figure 3:
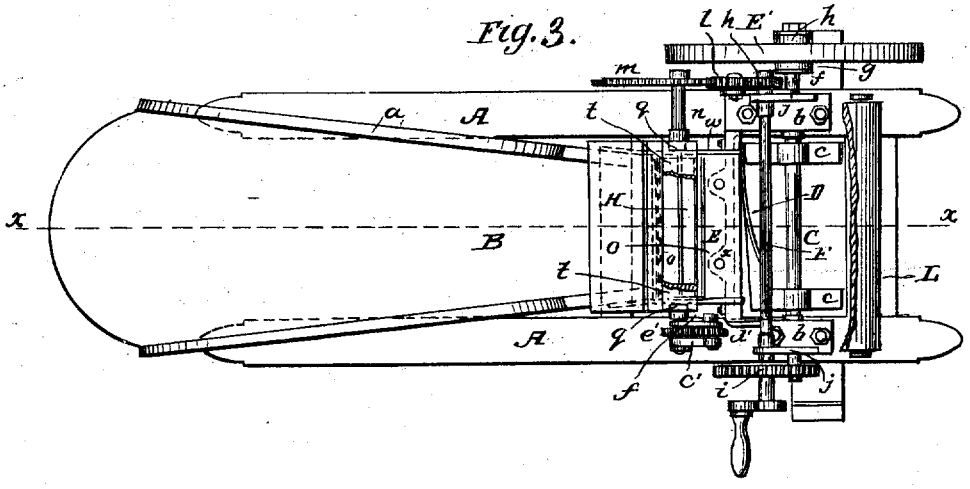

Figure 1 is a side view of my invention; Fig. 2, a vertical longitudinal section of the same at the line *x x*, Fig. 3; Fig. 3, a plan or top view of the machine partly in section; Fig. 4, a detached front view of a portion of the upper feed-roller with one of its bearings in section; Fig. 5, a detached central section of the fly-wheel fitted on its shaft; and Fig. 6 is a detached sectional view in the same plane as Fig. 2, illustrating the manner of setting the axis of the knife above the plane of the cutting-bar in order to cut the fodder obliquely.

Similar letters of reference indicate corresponding parts in the several figures.

My invention relates to a new and improved machine for cutting fodder. I employ a curved knife set upon arms and diagonal to its shaft, and acting upon the straw or other material that is fed along by a pair of rollers to separate the same by a slanting and shearing cut in consequence of the axis of the revolving cutter being higher than the standing cutter or shear. This standing cutter is supported upon a bar cast in one piece with the journal-boxes of the cutter-shaft, so as to be very rigid and preserve the cutting portions in their proper relative positions.

The fly-wheel is connected to the cutter-shaft by a yielding or friction-mechanism, so that the fly-wheel may be stopped gradually and preserve the knife from the injury that would result from suddenly stopping the inertia of the fly-wheel by a foreign substance in contact with the knife. The upper feed-roller is fitted in a frame provided with slings that pass to a spring or its equivalent, the said roller being free to accommodate the thickness of material fed into the machine, and said roller is guided as it rises and falls by hubs around the axis, moving in slots in guide-plates.

In the drawings, A represents the framing of the machine, which may be constructed of either wood or metal, and in any proper manner to support the working parts. B is a feed-box, which is placed on the framing A, and may be of the usual taper form, its sides *a a* being nearest together at its discharge end, as shown in Fig. 3.

On the front part of the framing A there are two bearings, *b b*, in which a shaft, C, is fitted and allowed to rotate freely. This shaft C has two arms, *c c*, firmly keyed upon it, and to one end of each arm the cutter or knife D is secured by screws or otherwise. This cutter or knife occupies a diagonal or spiral position, and as the shaft C is rotated works closely over the outer edge of a standing cutter, E, which is attached by screws or similiar means to a metal bar, *x*, that is formed with and extends across from one bearing *b* to the other, and the screw-holes in this bar *x* are elongated to admit of the cutter E being adjusted farther forward or backward, as desired, to compensate for wear either of the knife D or cutter E. The bar *x*, being in one piece with the bearings *b*, holds the cutter E in position much more reliably than is the case where screws or other connections intervene, which are liable to become misplaced or loosened in use.

The ends of the arms *c c* opposite to those where the cutter or knife D is attached are made somewhat heavy in order to counterpoise or balance the cutter or knife on the shaft, and thereby insure a uniform and easy rotation and cutting action.

On one end of the shaft C a fly-wheel, E′, is fitted. This shaft is shown with a collar, *e*, upon it, with a shoulder, *f*, at its inner end. The fly-wheel is fitted on this collar, the inner end of the hub *g* of the former being pressed against the shoulder *f* by a nut, *h*, which is on a screw cut on the shaft at the outer side of the collar *e*, and which bears against the outer end of the hub *g*. (See Fig. 5.) By screwing up the nut *h* to a greater or less extent, the hub *g* may be pressed more or less firmly against the shoulder *f*, and the fly-wheel secured to the shaft C more or less firmly, as desired, but not in any case so firm as to prevent the slipping of the wheel on its shaft when the cutter or knife is arrested in its motion by coming in contact with any hard foreign substance—such, for instance, as a thick stick, hard woody weeds, stalks, &c. By this slipping of the fly-wheel on its shaft the cutter or knife is greatly preserved, it being prevented from breaking and becoming nicked, strained, and bent under the action of the driving-power in connection with the inertia of the fly-wheel.

The collar *e* and shoulder *f* on the shaft C are not absolutely essential. The shaft C may be turned in slightly-taper form, and the hub *g* of the fly-wheel fitted upon it more or less tightly by means of a screw-nut, and the same end attained. I prefer, however, for the purpose the arrangement first described.

On the end of the shaft C opposite to that where the fly-wheel E′ is secured there is fitted a pinion, *h*′, which gears into a wheel, *i*, on a shaft, F, above the shaft C, the bearings of the shaft F being in upright plates *j j*, attached to the bearings *b b* of the shaft C. The shaft F has a pinion, *k*, upon it at the end opposite to that where the wheel *i* is attached, and this pinion *k* gears into a pinion, *l*, which gears into a wheel, *m*, on one end of the shaft *n* of a feed-roller, G, which is the lowest of a pair, and which shaft *n* works in fixed or immovable bearings. The shaft F is the driving-shaft of the machine, and the shaft C, on which the cutter-arms *c c* are placed, is above the level or plane of the standing cutter E, as shown in Fig. 2. This relative position of the shaft C and standing cutter E causes the diagonal cutter or knife D to act or work with a drawing and shearing cut, and consequently with greater facility than it otherwise would.

H is the upper feed-roller, the periphery of which may be provided with longitudinal ribs *o*, to catch and feed forward the substance in the feed-box B to be cut. The shaft *p* of this feed-roller H has its bearings in two slings, *q q*, which are placed one on each side of the feed-box B, and extend down below the same, and are connected at their lower ends by a cross-bar, *r*, to which a spiral spring, I, is attached, the lower end of said spring being connected to a cross-bar, *s*, at the lower part of the framing A. The upper ends of the slings *q q* are connected to a plate or board, *t*, to the back edge of which there is attached a pendent board or plate, *u*, which extends down back of the roller H to a level, or nearly so, with the axis *p* of the roller H, as shown in Fig. 2.

The spring I has a tendency to keep the upper roller, H, pressed down toward the lower fixed roller, G. A weight or lever, however, might be substituted.

Two cylindrical hubs, *w*′, at the ends of the roller H pass into the curved slots *v v* in plates *w w*, attached one to each side of the feed-box. The slots *v v* are parts of circles, of which the shaft C is the center, and consequently when the roller H rises and falls it moves in a circle concentric with C, and will, at all points of its movement, be at the same distance from C, and also have the same relative position with the cutter or knife D. This is an essential feature of the invention, for if the roller H were allowed to move up and down in a vertical plane under the different thickness of the layer of straw or other substance beneath it to be cut, its distance would vary materially in relation with the cutter or knife, and be, when elevated, so far from the latter that the straw or other substance to be cut would not be held firmly in position. The substance to be cut is fed to the cutter or knife by the action of the two rollers G H.

The hubs *w*′ may be loose rings upon the shaft *p*, or hubs projecting inward from the slings *q q*. In either case the shaft *p* is protected from friction and wear against the sides of the slots *v v*.

To admit of the aforesaid motion of the roller H a peculiar gearing is necessary, in order that said roller may be properly rotated while in any position. This gearing is arranged as follows: The shaft *n* of the lower feed-roller, G, has a pinion, *a*′, at its end opposite to that where the wheel *m* is attached, and the pinion *a*′ gears into a pinion, *b*′, the axis of which is a gudgeon attached to a bar, *c*′, the lower end of which bar *c*′ is fitted loosely on the shaft *n*.

The pinion *b*′ gears into a similar pinion, *d*′, the axis of which is a gudgeon, also attached to the bar *c*′, and the pinion *d*′ is kept in gear with a pinion, *e*′, on the shaft *p* of the upper roller, H, by means of a link, *f*′, which is attached to the gudgeon of the pinion *d*′ at the upper end of the bar *c*′ and fitted loosely on the shaft *p*. By this arrangement the roller H is allowed to rise and fall without disconnecting the driving-gears.

The board or plate *u*, which extends down back of the upper roller, H, prevents the straw or other substance from passing over the top of said roller—a contingency which would be liable to occur were said board fixed or stationary, as it would necessarily require to be placed sufficiently high to admit of the thickest layers of straw or substance to be cut passing underneath it, and a thin layer would consequently be liable to pass over the roller H, the latter in that case being quite low, and the lower edge of the board *u* quite high.

My arrangement, it will be seen, completely obviates this difficulty, as the board *u* moves up and down with the roller H.

L is a curb or cap which covers the cutter or knife D, and J is a chute which conducts the cut substance down at the front part of the machine.

The substance to be cut may be cut into pieces of greater or less length by varying the relative size of the pinions *k l*.

What I claim, and desire to secure by Letters Patent, is—

1. So attaching the balance-wheel to its shaft by a yielding or frictional device that when the knife meets with an obstruction the wheel may continue to revolve for a limited period, independent of the knife, until stopped by the frictional device, for the purpose of preventing injury to the knife, substantially as herein described.

2. The bar $c'$, connected to the shaft $n$, and carrying the pinions $b'$ and $d'$, in combination with the pinions $a'$ and $e'$ and link $f'$, connected to the shaft $p$ in substantially the manner specified, whereby the rollers H and G on the shafts $n$ and $p$ are allowed to move apart, and the wheels remain in gear, as set forth.

3. The guide board or plate $u$, connected to and moving with the frame $t$ of the upper feed-roller, H, and extending down at the back of the said roller to near a level with its axis, substantially as and for the purposes set forth.

4. The bearing-bar $x$, formed in one piece with the lower halves, $b$, of the journal-boxes of the cutter-shaft C, and extending across from one to the other, in combination with the standing cutter E, attached to said bar $x$, substantially as and for the purposes specified.

5. Mounting the upper feed-roller, H, in a frame formed with slings extending below the lower roller and acted upon by a spring or its equivalent, in combination with a slotted frame to guide the roller as it moves up or down, substantially as set forth.

6. The hooked slings $q$, in combination with the yielding feed-roller H and spring I, or its equivalent, substantially as set forth, whereby the said feed-roller H is limited in its lateral movement, as set forth.

7. The curved slot $v$ in the frame $w$, in combination with the feed-roller H, slings $q$, and a hub, $w'$, surrounding the axis $p$ of the roller H, and relieving the same from friction against the frame $w$, as set forth.

8. In combination with the bar $x$ and standing cutter E, made as set forth, the single revolving and diagonal knife D, with its axis placed above the standing cutter E, to act with a slanting and shearing cut, substantially as set forth.

In witness whereof I have hereunto set my signature this 6th day of September, A. D. 1866.

FRANKLIN BENJAMIN HUNT.

Witnesses:
GEO. D. WALKER,
CHAS. H. SMITH.